United States Patent
Ludke et al.

(10) Patent No.: US 6,219,060 B1
(45) Date of Patent: Apr. 17, 2001

(54) RENDERING OF SURFACES FROM VOLUMETRIC DATA EMPLOYING BOTH DIVIDING AND STRETCHING CUBES

(75) Inventors: Siegwalt Ludke, Scotia; Harvey Ellis Cline, Schenectady, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/173,332

(22) Filed: Oct. 15, 1998

(51) Int. Cl.$^7$ ................................................ G06T 17/00
(52) U.S. Cl. ................................. 345/424; 345/427
(58) Field of Search .............................. 345/418, 419, 345/420, 423, 424, 426, 427

(56) References Cited

U.S. PATENT DOCUMENTS

| | | | |
|---|---|---|---|
| 4,719,585 | 1/1988 | Cline et al. | 364/518 |
| 5,226,113 | * 7/1993 | Cline et al. | 345/424 |
| 5,781,194 | * 7/1998 | Ponomarev et al. | 345/427 |
| 5,841,892 | * 11/1998 | Mcgrath et al. | 345/424 |
| 5,963,211 | * 10/1999 | Oikawa et al. | 345/424 |
| 6,040,835 | * 3/2000 | Gibson | 345/426 |
| 6,054,992 | * 4/2000 | Gibson | 345/424 |
| 6,084,979 | * 7/2000 | Kanade et al. | 345/425 |

* cited by examiner

Primary Examiner—Cliff N. Vo
(74) Attorney, Agent, or Firm—Jean K. Testa; Marvin Snyder

(57) ABSTRACT

Anisotropic data having data spacing significantly larger between layers of data compared with spacing between adjacent data values, is supplemented with additional data to approximate isometric data. The ratio of spacing in one dimension to another is referred to as an aspect ratio A. Preferably, spacing is halved until spacing a modified aspect ratio A' is near unity. Intermediate values are interpolated between existing values of the anisotropic data to create approximate isotropic data having a modified aspect ratio A'. Surface voxels are determined from the approximate isotropic data. The values of the adjacent voxels are then used to determine a vector normal to the surface at the central voxel. This is repeated for a number of central voxels to determine a surface. The viewing elevation angle is converted to an effective elevation angle. The surface is then rendered into a 2D screen image as if it were created from isotropic data. The resulting distorted 2D image is then stretched by an amount related to the approximate aspect ratio A' to result in a high-resolution non-distorted image. The surface then may be displayed.

7 Claims, 4 Drawing Sheets

RENDERING OF SURFACES FROM VOLUMETRIC DATA EMPLOYING BOTH DIVIDING AND STRETCHING CUBES

CROSS REFERENCE TO RELATED APPLICATIONS

This application is related to application RD-25,196 Ludke, et al. Ser. No. 08/787,526, filed Jan. 21, 1997, entitled "A Fast Method of Creating 3D Surfaces By 'Stretching Cubes'" by S. Ludke, H. Cline assigned to the present assignee and hereby incorporated by reference.

BACKGROUND OF THE INVENTION

1. Field of the Invention

The present invention relates to rendering three-dimensional surfaces from volumetric data.

2. Description of Related Art

Regularly spaced volumetric data acquired from various sources such as computer tomography (CT), magnetic resonance (MR) imaging, ultrasound, and various other imaging means defines volume pixels or 'voxels' between the data. The data values represent a physical aspect of the object being imaged at a number of locations throughout the imaging volume. Typically these values change significantly at interfaces between different types of material. These interfaces may be visualized as surfaces. Besides indicating the interface of two materials, as in the case in medical imaging, they may be arbitrary thresholds as in the case of temperature differences, indicating isotherms or pressure differences indicating isobars of weather data. For whatever use, it is important to visualize surfaces within a block of volumetric data.

Many times the spacing between adjacent measurement points is different from the spacing between layers of adjacent measurements. For example, data values having equal spacing between adjacent values and between layers would have an aspect ratio of (length; width; height) of (1:1:1). An aspect ratio for measurements having equal spaces between adjacent measurements but twice the distance between layers would have an aspect ratio of (1:1:2). Since many systems employ the same spacing between adjacent data values in a "layer" but a different spacing between layers of data, the measurements may be described by an 'aspect ratio' A, being the relative spacing of the long dimension(s) to the short dimension(s), such as A=2, in the above example.

U.S. Pat. No. 4,719,585, Jan. 12, 1988, Cline et al. "Dividing Cubes System and Method for the Display of Surface Structures Contained Within the Interior Region of a Solid Body" ("Dividing Cubes") describes a method of determining surfaces in volumetric data and rendering those surfaces. An objective of the 'dividing cubes' patent is to break up the voxels of the volumetric data into successively smaller voxels and to interpolate intervening values in three dimensions. This employed tri-linear interpolation, to create other intervening values. Tri-linear interpolation typically is computationally expensive and slows the process down. This method would be faster if there were no tri-linear interpolation.

In many types of rendering and imaging it is important to quickly render surfaces. Dividing cubes is most efficient when the aspect ratio are integral numbers. For example an aspect of ratio of A=4 would be computationally less expensive than a fractional ratio such as A=4.36. This is because their fractional aspect ratios require floating point math.

The 'stretching cubes' application referenced above describes another method of dealing with anisotropic volumetric data. In stretching cubes the order of rotation and scaling is reversed to eliminate the need for 3D interpolation. Interpolation occurs in 2 dimensions on the 2D-screen image. An isotropic volumetric data set is treated as if it were isotropic with an aspect ratio A=1. The model is rotated and rendered into a two dimensional screen space producing a data for a distorted 2D-screen image.

Knowing beforehand the aspect ratio A and the angles at which the model is to be rendered, it is a simple geometry problem to work backwards to determine the degree which the 2D screen image is distorted. The 2D-screen image is then 'distorted' in a direction opposite to the calculated distortion based upon the rendering angles and the aspect ratio of the original data. This may be done quickly since it is applied in two dimensions.

However, the resolution of the resulting 2D-screen image is dependent upon the viewing angle of the image. Since it is 'stretched' more in one dimension than another, the resolution suffers depending upon the selected viewing angle.

Currently there is a need for a rapid and high-resolution method of rendering surfaces from anisotropic volumetric data.

OBJECTS OF THE INVENTION

It is an object of the present invention to provide a simplified method rendering anisotropic volumetric data.

It is another object of the present invention is to provide a method of rendering anisotropic volumetric data more rapidly than was previously possible.

Another object of the present invention is to provide a higher resolution surface image from anisotropic volumetric data for a given degree of computation.

SUMMARY OF THE INVENTION

In this process, anisotropic data having an aspect ratio of A is modified into approximate anisotropic data. This is performed by interpolating equally spaced layers of data between existing layers. This is most preferably done by reducing the spacing by a reduction factor $R=1/2^n$ ($n=1, 2, 3 \ldots$). This is equivalent to halving the spacing until the new, modified aspect ratio A' closest to unity results. This is similar to the 'Dividing Cubes' method.

In the second phase of the present invention, an image is created of the approximate isotropic data rendered as if it were isotropic data.

This 2D-screen image is then 'stretched' according to its rendered angle, similar to the 'Stretching Cubes' method. The approximate isotropic data is still anisotropic, however, the modified aspect ratio A' is closer to unity. Therefore, there is less 'stretching' of the rendered 2D image, as performed by the 'Stretching Cubes' method, and will not significantly reduce the resolution of the image.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE INVENTION

The 'Dividing Cubes Method' referenced above requires tri-linear interpolation in 3 dimensions, and renders models at lower speeds than if there were no tri-linear interpolation. This may make the system impractical for certain uses, such as in a clinical setting where a Physician may need real-time, interactive feedback.

If a 3D model of sampled data can be rendered with little or no interpolation, there would be a large gain in efficiency. However, many volumetric data sets are anisotropic.

The present invention combines principles, and benefits of both the 'Dividing Cubes' method and the 'Stretching Cubes' method into a single improved method.

Figure 1:
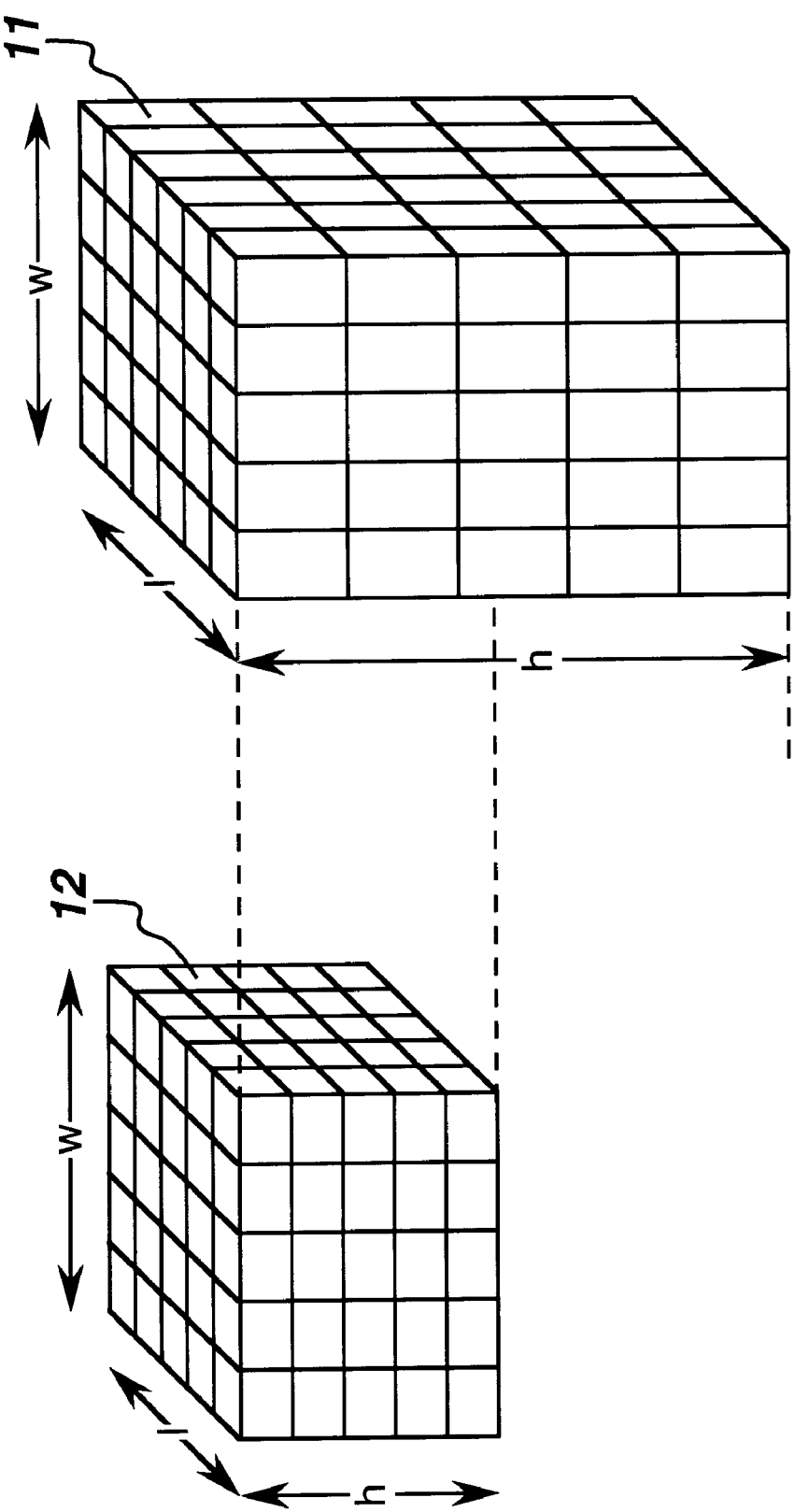
FIG. 1 is an illustration of voxels of isotropic and anisotropic volumetric data.

In FIG. 1 an isotropic volumetric data 12, and an anisotropic data set 11 are shown in FIG. 1. The volumetric data sets 11, 12 have volume pixels ('voxels'), bounded by data values on each of their corners. Isotropic data set 12 has equal spacing between all data values. The spacing h between 'slices' of data in one dimension, do not equal the spacing between data points in the other dimensions, l, w in volumetric data set 11, making it anisotropic. A volumetric data source may store the spacing information between adjacent data, and between slices of data points l, w, h, in the data set. If one were to render surfaces of anisotropic data set without correction, the voxels the resulting image would be distorted.

The coordinate system for data set 11 is shown with the long axis of the voxels being aligned along the z axis.

Creating Additional Data

In the Dividing Cubes method, additional data is created and interleaved in the existing anisotropic volumetric data to approximate isotropic data. This is performed by reducing the spacing of the largest dimension, h, by interpolating additional intervening layers of data in three dimensions.

The present invention creates intervening data values requiring only a one-dimensional interpolation. For example intervening data layers may be created by one dimensional interpolation of adjacent existing data. This may be repeated several times to result in additional data layers to result in spacing which approximates an aspect ratio A=1.

Computer representations of numbers are powers of 2. Division and multiplication by 2 in a computer is a simple right and left shift, respectively. Therefore division of the spacing by a factor of 2, or a power thereof, $2^n$, n=1, 2, 3 ... is the most efficient method of subdivision of voxel spacing. In other words, spacing is multiplied by a reducing factor $R=1/(2^n)$, (where n=1, 2, 3, ... ).

An integer number n is selected to reduce the spacing as close to isotropic as possible. It is also possible to divide the spacing by fractional values, however, the processing overhead makes this less efficient.

The subdivision is important since it permits the construction of images in which the physical resolution of the data collected is closely matched to the pixel resolution on the display device. This is a very desirable feature of the present invention since it permits optimal use of the data available in terms of the display device being employed. It is also particularly advantageous in that it facilitates zooming and enlargement operations.

Determining Surface Voxels

Figure 2:
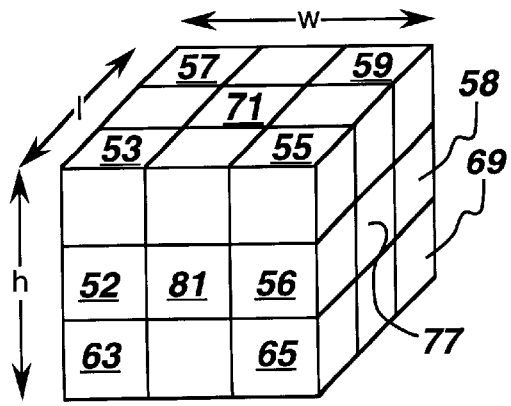
FIG. 2 is an illustration identifying voxels of approximate isotropic data used to determine surface voxels for rendering according to the present invention.
Figure 3:
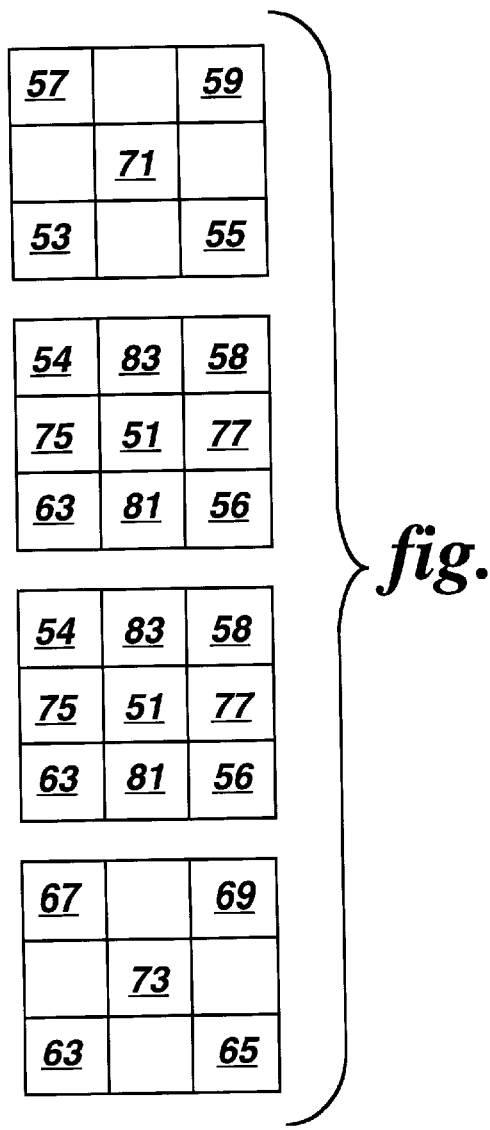
FIG. 3 is a plan diagram identifying voxels of approximate isotropic data of FIG. 2.

Surfaces within the volumetric data set are desired to be imaged. A subset of voxels of the approximate isotropic data set (created by interleaver device 10 of FIG. 5) is shown in FIG. 2. A view of each of the layers of voxels is shown in FIG. 3 in a plan diagram. For example, starting with an aspect ratio A=4.36 in FIG. 1, by reducing spacing by $R=1/(2^n)$ with n=2 results in an approximate isotropic data set in FIG. 2 having an aspect ratio of A=1.09 is created.

The present invention functions by selecting a voxel as a central voxel 51. Central voxel 51 is then tested against a threshold, which may be provided by an operator, or predetermined. If central voxel 51 is below the threshold, then it is considered external to an object and a new central voxel is selected. If the central voxel is above the threshold, then diagonal voxels, each sharing a vertex of the central voxel, are tested to determine if they are below the threshold value.

Diagonal voxels 53, 55, 57, 59, 63, 65, 67, 69 each share a single corner with central voxel 51. If at least one diagonal voxel is above the threshold, then central voxel 51 is categorized as a surface voxel. These comparisons may be done in parallel to increase speed.

(The above description assumes that the object desired has a higher pixel value than surrounding values, such as bone. The present invention also works for desired structures with a lower pixel value than surrounding values, such as a lung.) In this case, a lower threshold is selected. Surface voxels are now defined as central voxels having values below the threshold, with at least one diagonal voxel being above the threshold.

Threshold ranges may also be used in which central voxel 51 is tested to determine if it is within the threshold range, with diagonal voxels tested to determine if at least one is outside of the range. This is used where the object desired to be imaged has pixel values, which vary over a small range.

The central voxel is incremented to another voxel, typically a next neighboring voxel. A new 3×3×3 group of voxels is then chosen, and the process is repeated. This continues until all voxels have been tested.

In another embodiment, additional voxels may be tested after the central voxel, such as middle layer voxels 52, 56, 54, 58. This provides additional accuracy as a tradeoff against speed.

Surface Normals

For each surface voxel, a normal vector to the surface is created. For each surface voxel, shown as central voxel 51 in FIG. 3, six neighbor voxels are used to determine a surface normal vector. A lower voxel 73, immediately below central voxel 51, has its value subtracted from an upper voxel 71 to determine a difference in the y direction. Similarly, a left voxel 75 is subtracted from a right voxel 77 to result in an x difference. And a value of front voxel 81 is subtracted from a value of rear voxel 83 to result in a z difference. The x, y, z differences are used to determine a magnitude g according to:

$$g = sqrt\{(x\ \text{diff})^2 + (y\ \text{diff})^2 + (z\ \text{diff})^2\};$$

where x diff=voxel 77−voxel 75, y diff=voxel 71−voxel 73, and z diff=voxel 83−voxel 81.

Each is normalized according to:

$$N_x = x\ \text{diff}/g$$
$$N_y = y\ \text{diff}/g$$
$$N_z = z\ \text{diff}/(A'*g);$$

and $$A' = h/w;$$

where A' is an aspect ratio of the approximate isotropic data being the ratio of the long side of the voxel, h, to either shorter equal sides, l or w.

Together ($N_x$, $N_y$, $N_z$) defines a vector 85 normal to a surface located at central voxel 51. This is repeated with each of the surface voxels as central voxel 51.

Creating a 2D Distorted Image

If one were to use isotropic voxels in place of anisotropic voxels and correct for the differences, imaging would be much faster since there would be no need for interpolation.

Typically, an operator provides a viewing angles (elevation, azimuth, roll) in which the surface voxels are to be viewed. The viewing angles may also be predetermined or scanned through a preset range. The viewing angles are defined as rotations about the x, y, z axes, respectively, and in that order.

In imaging typically only the azimuth angle and the elevation angle are used. Take for example an image of a subject's head as it would appear with the subject standing facing you. The x axis would pass through the subject's ears, the y axis through the top of the head through the center of the neck. The z axis would pass through the nose head and exit through the back of the skull.

A rotation about the x axis would cause the head to rotate up and down, as in signaling 'yes'. A rotation about the y axis would rotate the head side to side, as in signaling 'no'. A rotation about the z axis merely rotates the image upside down. Therefore, the last of the three orientation angles, roll, has little effect on an image since it is the equivalent of rotating a screen image in a clockwise or counterclockwise fashion. For imaging purposes, only azimuth and elevation will be analyzed.

An azimuth angle rotation, if performed first, and the volumetric data set is aligned such that the axis of azimuth rotation is parallel to the long axis of the anisotropic voxels, the result is the same as using isotropic voxels.

Therefore, the only viewing angle left to correct is elevation. In U.S. Pat. No. 5,226,113, Jul. 6, 1993, by Cline, Ludke, Dumoulin, Souza, "Method and Apparatus for Volumetric Projection Rendering Using Reverse Ray Casting", assigned to the present Assignee and hereby incorporated by reference, anisotropy in projection images was corrected after the image was created by stretching the resulting image to provide an accurate projection.

Figure 4:
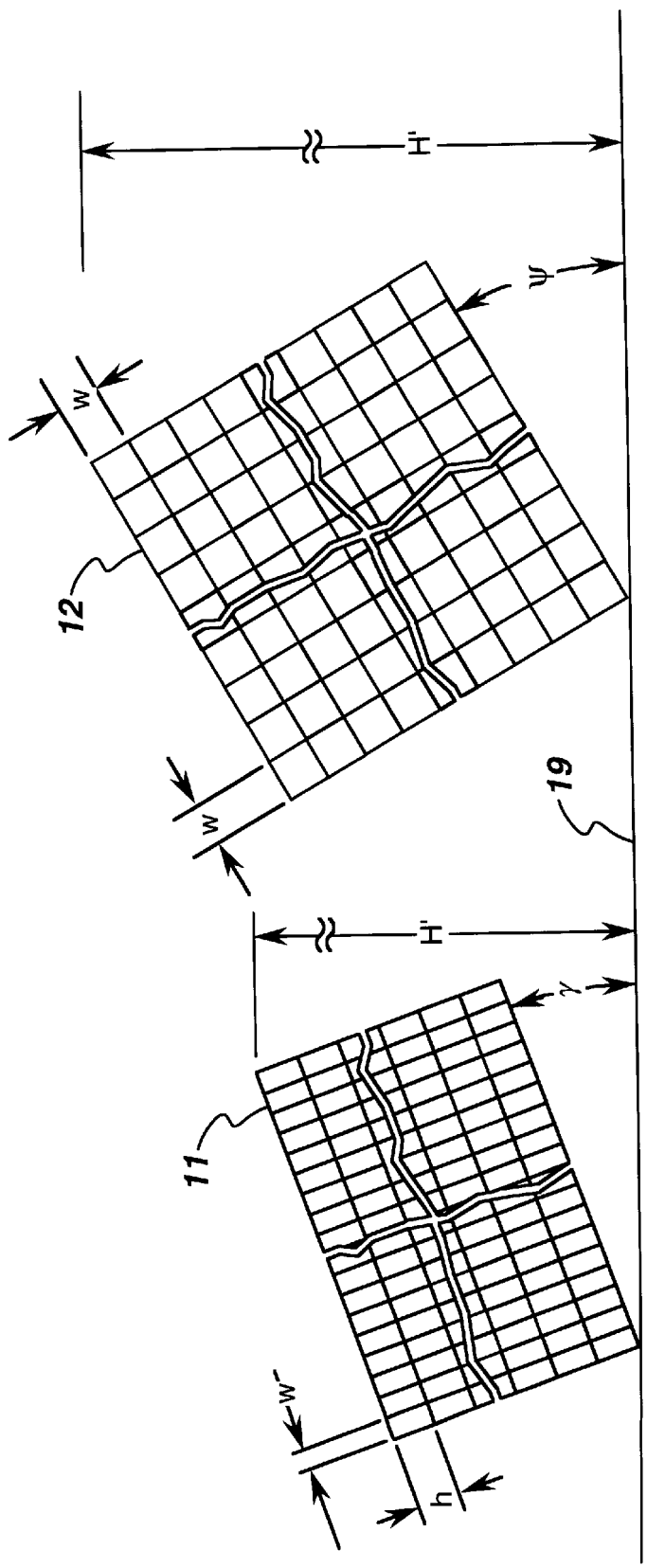
FIG. 4 is an illustration of the effect of anisotropy on elevation angles.

FIG. 4 shows anisotropic volumetric data voxels 11 and isotropic volumetric data voxels 12 in a side view showing the effect of anisotropy on elevation angle. If one desired to view the surface voxels at an elevation angle $\gamma$, it would effectively be an angle $\psi$ using isotropic data. $\gamma$ is converted to $\psi$ according to:

$$\psi = \arctan(\tan(\gamma)/A')$$

where A'=the modified aspect ratio of the approximate isotropic data set.

Stretching the Image

The use of anisotropic voxels, besides requiring correction to the viewing angles $\psi$, also requires correction to screen height H', H.

A scale factor $E_S$ is used to multiply the coordinates of the image produced to offset the image in one screen direction, but not the second. The surface voxels are then display as viewed from (azimuth, $\psi$) to result in pixels each having screen locations (u,v). If the coordinate system is set up for the elevation angle to be measured from an axis perpendicular to the long axis of the anisotropic voxels, then the vertical screen coordinates 'v' coordinates, are multiplied by a scaling factor $E_S$ as defined below:

$$E_S = sqrt\{(A'\ \cos(\gamma) + \sin^2(\gamma))\}$$

$$(u,v') = (u, v*E_S s).$$

Figure 5:
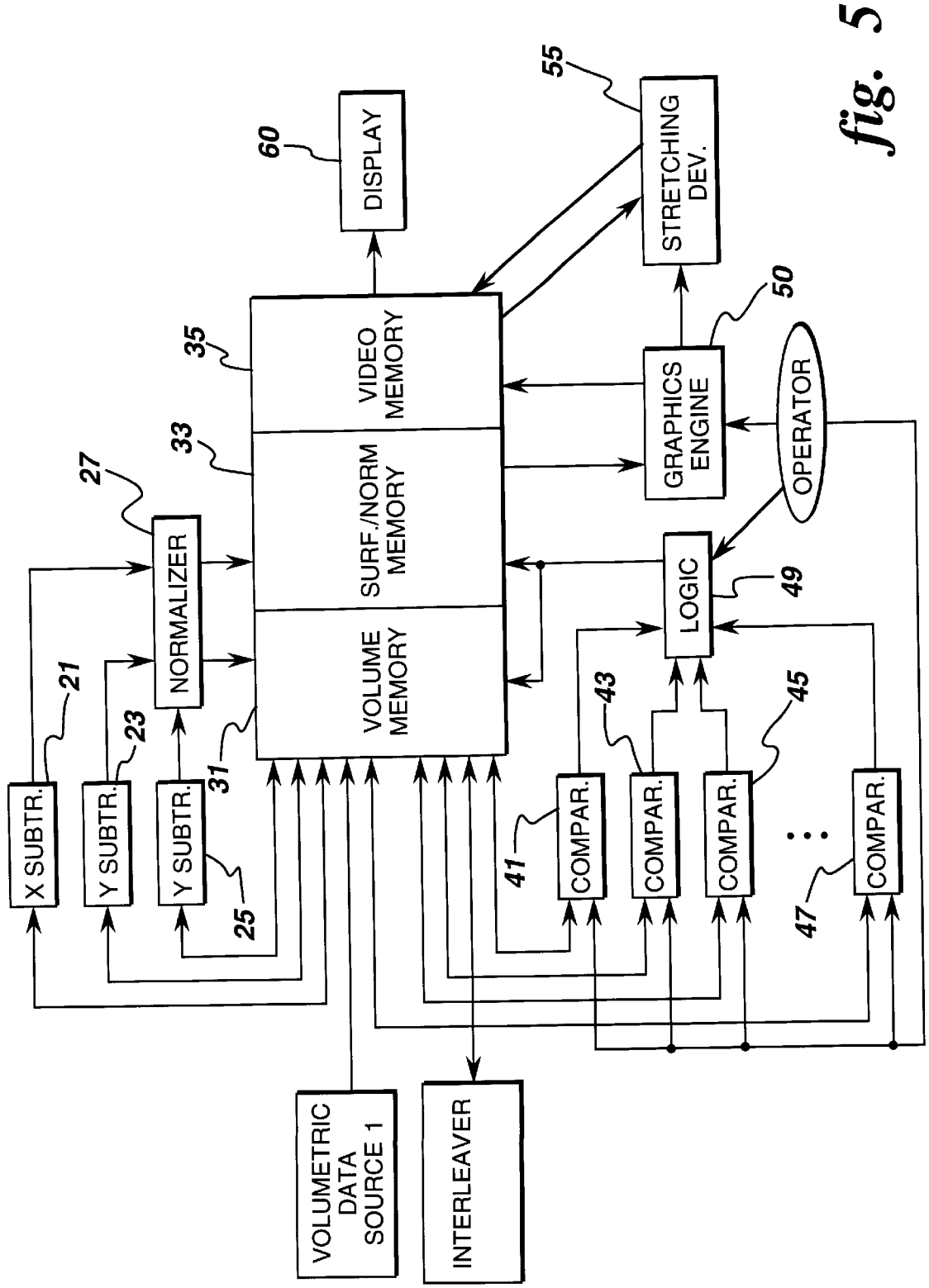
FIG. 5 is a simplified block diagram of one embodiment of the present invention.

FIG. 5 is a simplified block diagram of one embodiment of the present invention. Volumetric data 11 (which is anisotropic) is provided from volumetric data source 1. This may be any physically measurable property, which varies throughout space or time. This is provided to and stored in a volumetric memory 31.

Accordingly, interleaver device 10 interpolates additional intervening layers of data.

A interleaver device 10 reads in the volumetric data from volumetric memory 31 and creates an approximate isotropic data set by dividing spaces by a factor of 2 and creating new data points. It then stores the approximate isotropic data in a different section of volumetric memory 31 that may be a portion of a larger shared memory 30. It may also store either the modified aspect ratio A', or dimensions of the modified anisotropic voxels.

A logic device determines a central voxel to be tested. It stores the location (index) of central voxel 51, or passes it directly to a comparitor 41. Comparitor 41 also receives a threshold value defining an isosurface. This may be manually provided by an operator, predetermined, or calculated and received from another device. As described above, a threshold range may also be used and voxels tested to determine if they are within or outside of a threshold range. Comparitor 41 then extracts the central voxel value from volume memory 31. It then tests if the central voxel value against the threshold. If central voxel is below the threshold, it indicates so to logic device 49 which chooses another central voxel index, and the process is repeated (assuming that the desired object has a high voxel value as discussed above).

If the value of the central voxel is above the threshold, then a plurality of comparitors 43, 45, 47 each receive the threshold value, the index of the central voxel from volume memory 31 and each extracts a diagonal voxel, such as 53, 55, 57, 59, 63, 65, 67, 69 of FIGS. 2, 3 from volume memory 31. The diagonal voxels are all neighbors of a central voxel 51. Each comparitor compares the value of the diagonal voxel to the threshold received.

The results of the comparison are passed to a logic device 49 that determines if there is at least one diagonal voxel value below the threshold, indicating a surface voxel.

Logic device 49 saves surface voxel location (or data set indices) in a surface/normal memory 33, which may be a portion of a shared memory 30. Each time a surface voxel is encountered, logic device indicates the location (or indices) of the surface voxel to x, y, and z subtraction devices, 21, 22, 23, respectively, either directly, or through shared memory.

An x subtraction device 21 decrements the x index of the surface voxel index to get left voxel 75. It then increments the x index of the surface voxel index to get a value of right voxel 77. It then subtracts the left voxel from the right voxel to determine an x difference.

Similarly, a y subtraction device 23 decrements and increments the surface voxel y index to get lower, upper voxels 73, 71 and determines a y difference.

Finally, a z subtraction device 25 decrements and increments the surface voxel z index to get front, rear voxels 81, 83 and determines a z difference.

A normalizer 27 receives the x, y, z differences, and computes a magnitude g according to:

$$g = sqrt((x\ \text{diff})^2 + (y\ \text{diff})^2 + (z\ \text{diff})^2).$$

Normalizer 27 reads from volume memory 31, or calculates, the modified aspect ratio A', and vector components $N_x$, $N_y$, $N_z$ according to:

$$N_x = (x\ \text{diff})/g;$$

$$N_y = (x\ \text{diff})/g;$$

$$N_z = (x\ \text{diff})/(A'*g).$$

$N_x$, $N_y$, $N_z$ define a vector 85 normal to the surface at the location of central voxel 51, which is stored along with the location (indices) of the surface voxel which it is associated with in surface/normal memory 33.

This is repeated until all voxels intended to be rendered are tested. A graphics engine 50 reads the entries of surface/normal memory 33 and also receives a desired viewing angles (azimuth, elevation γ, roll) which may be manual input from and operator, predetermined, or provided by another device. Graphics engine 50 converts the desired elevation angle γ to an effective elevation angle ψ for anisotropic data as set forth above, then renders desired surfaces as viewed from (azimuth, effective elevation ψ). Graphics engine 50 stores its output as 2D screen pixel data in a video memory 35. In the case of isotropic data, the 2D screen pixel data may then be displayed on a display device 60.

When anisotropic data set is used, a stretching device 55 is coupled to the video memory 35, reads the 2D screen pixel data, receives the elevation viewing angle and multiplies the vertical location 'v' of each of the screen pixel locations by scaling factor $E_S$ according to:

$$E_S = sqrt[(A'\ \cos(\gamma))^2 + \sin^2(\gamma)].$$

$$(u,v') = (u, E_S*v).$$

This offsets the data value locations of the 2D screen pixel data, according to the relative ratio of non-uniformity of the voxel spacing and the viewing angle, in effect, distorting the image in an opposite direction to the distortion incurred by anisotropy.

The video memory 35 may then be displayed on display device 60 showing correctly rendered surfaces.

While several presently preferred embodiments of the present novel invention have been described in detail herein, many modifications and variations will now become apparent to those skilled in the art. It is our intent therefore, to be limited only by the scope of the appending claims and not by the specific details presented by way of illustration.

What we claim is:

1. A method of displaying surfaces of anisotropic volumetric data, having data values defining voxels with a spacing between data values in a length, width, height direction being (l, w, h) and having an aspect ratio A, comprising the steps of:

a) approximating isotropic data having a modified aspect ratio of A' by interpolating the anisotropic data to create intervening data;

b) determining which voxels are surface voxels;

c) receiving a viewing angle (azimuth, elevation γ) of a desired view of the surface voxels;

d) offsetting the (u,v) locations of the pixel data to new locations (u,v') so as to scale the image according to:

$$E_S = sqrt[(A'\ \cos(\gamma))^2 + \sin^2(\gamma)];$$

$$(u,v') = (u, E_S*v),$$

where γ is elevation of the desired viewing angle; and e) rendering the surface voxels and surface normal vectors at the desired viewing angle (azimuth, elevation γ) as screen pixel data each having an (u,v') screen location, pixel color, and intensity as viewed from a modified viewing angle taking into account said modified aspect ratio, A', as an image to an operator.

2. The method of displaying surfaces of anisotropic volumetric data of claim 1 wherein the step of determining surface voxels comprises the steps of:

a) selecting a central voxel;

b) testing the central voxel against a predetermined threshold;

c) for each central voxel above the predetermined threshold:

i. determining a plurality of diagonal voxels and their values relative to the central voxel;

ii. comparing each diagonal voxel value to the predetermined threshold;

iii. categorizing the central voxel as a surface voxel, if at least one diagonal voxel value is below the threshold;

iv. calculating a surface normal vector for each surface voxel from differences between values of voxel straddling the central voxel; and d) repeating steps "a"–"c" for a plurality of different voxels as the central voxel to result in a plurality of surface voxels and surface normal vectors.

3. The method of displaying surfaces of claim 1 wherein the step of approximating isotropic data comprises the steps of:

a) determining an integer an integer reducing factor $R = 1/2^n$ where n is an integer selected such that $R*h$ is closest to unity;

b) interpolating intervening data locations between existing data of the dataset;

c) interpolating new values at these locations to result in approximate isotropic data set.

4. The method of displaying surfaces of volumetric data of claim 1 wherein the step of calculating a surface normal comprising the steps of:

a) selecting an adjacent voxel to the left of the central voxel as a left voxel;

b) selecting an adjacent voxel to the right of the central voxel as a right voxel;

c) subtracting the left voxel from the right voxel to determine an x difference;

d) selecting an adjacent voxel in front of the central voxel as a front voxel;

e) selecting an adjacent voxel behind the central voxel as a rear voxel;

f) subtracting the front voxel from the rear voxel to determine an y difference;

g) selecting an adjacent voxel below the central voxel as a lower voxel;

h) selecting an adjacent voxel above the central voxel as an upper voxel;

i) subtracting the lower voxel from the upper voxel to determine an y difference;

j) normalizing the x,y,z differences into vector components $N_x$, $N_y$, $N_z$ according to:

$g = sqrt(x \text{ difference}^2 + y \text{ difference}^2 + z \text{ difference}^2)$ $N_x = x \text{ difference}/g;$ $N_y = y \text{ difference}/g;$ $N_z = z \text{ difference}/(A'*g);$ k) storing vector components $N_x$, $N_y$, $N_z$ as a surface normal vector along with its associated voxel index, or location.

5. The method of displaying surfaces of volumetric data of claim 1 further comprising, before the step of rendering, the step of:

adjusting the elevation angle $\gamma$ into an effective elevation angle $\psi$ according to:

$\psi = \tan^{-1}((1/A')(\tan(\gamma)))$, and the effective elevation $\psi$ is used in place of elevation angle $\gamma$ to render the surface voxels.

6. A graphics system for displaying surfaces of volumetric data, having voxels values each at a specified location, and index, without interpolation, comprising:

a) a interleaver device operating to receive anisotropic volumetric data and interpolate intermediate values to approximate isotropic data;

b) a volumetric memory adapted for storing said volumetric data;

c) a plurality of comparators each coupled to the volumetric memory, for reading an indices of a central voxel, offsetting the indices to determine a diagonal voxel, and for comparing the diagonal voxel value with a predetermined threshold;

d) a surface/normal memory capable of storing surface voxel indices and vectors normal to the surface for each surface voxel;

e) a logic device coupled to the comparators for selecting an index for each central voxel, and storing the indices of the central voxel in the volumetric memory, for receiving the output of the comparators, and for categorizing central voxels as a surface voxel if at least one of their diagonal voxel values tests to be on the opposite side of the threshold from its own test, and for storing indices of surface voxels in the surface/normal memory;

f) an x subtraction device for calculating indices of voxels straddling the central voxel in the x direction, and subtracting these voxel values to result in a x difference;

g) an y subtraction device for calculating indices of voxels straddling the central voxel in the y direction, and subtracting these voxel values to result in a y difference;

h) an z subtraction device for calculating indices of voxels straddling the central voxel in the z direction, and subtracting these voxel values to result in a z difference;

i) a normalizer coupled to the subtraction devices for receiving the x, y, z differences and normalizing then into a surface vector components ($N_x$, $N_y$, $N_z$) and storing the vector components in the surface/normal memory;

j) a video memory capable of storing information defining images;

k) a graphics engine, coupled to the surface/normal memory, and the video memory, for receiving and adjusting the viewing angle for anisotropy, for reading in the surface voxel indices and normal vectors and for creating pixel data, being screen locations (u,v) and pixel color, for rendering a surface viewed from the desired viewing angle, and storing the pixel data in the video memory;

m) a stretching device coupled to the video memory, and the interleaver device, for receiving the pixel data, and the viewing angle, and offsetting the (u,v) locations of the pixel data to new locations (u,v') so as to scale the image according to:

$E_S = sqrt[(A' \cos(\gamma))^2 + \sin^2(\gamma)]$.

$(u,v') = (u, E_S*v);$ where A' is an aspect ratio of the voxels of the approximated isotropic data from the interleaver device, $\gamma$ is elevation of the desired viewing angle such that the image is stretched to correct distortion caused by anisotropy, and the pixel data at offset location (u,v') are stored in the video memory; and l) a display device coupled to the video memory, for displaying the offset pixel data (u,v') as an image.

7. The graphics system for displaying surfaces of claim 6 wherein the interleaver device operates to reduce spacing between furthest spaced data of anisotropic data by R=1/($2^n$), where n is an integer value, and creates intervening data at new intervening locations to create a modified data set having a modified aspect ratio, A', closer to unity.

* * * * *